(12) United States Patent
Boulivan

(10) Patent No.: US 10,549,742 B2
(45) Date of Patent: Feb. 4, 2020

(54) VEHICLE TRAILER BRAKE SYSTEM AND METHOD

(71) Applicant: AGCO International GmbH, Neuhausen (CH)

(72) Inventor: Guillaume Boulivan, Beauvais (FR)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/762,655

(22) PCT Filed: Sep. 15, 2016

(86) PCT No.: PCT/EP2016/071819
§ 371 (c)(1),
(2) Date: Mar. 23, 2018

(87) PCT Pub. No.: WO2017/050632
PCT Pub. Date: Mar. 30, 2017

(65) Prior Publication Data
US 2018/0273014 A1    Sep. 27, 2018

(30) Foreign Application Priority Data

Sep. 23, 2015 (EP) .................................... 15290239

(51) Int. Cl.
*B60T 17/22* (2006.01)
*B60T 8/17* (2006.01)
(Continued)

(52) U.S. Cl.
CPC ............ *B60T 17/221* (2013.01); *B60T 7/042* (2013.01); *B60T 8/1701* (2013.01); *B60T 8/171* (2013.01);
(Continued)

(58) Field of Classification Search
CPC .......... B60T 7/042; B60T 7/20; B60T 8/1708; B60T 8/1701; B60T 8/171; B60T 13/14;
(Continued)

(56) References Cited

U.S. PATENT DOCUMENTS 3,880,472 A    4/1975   Lewis et al.
4,671,578 A *  6/1987   Rothen .................... B60T 8/00
                                                         303/15
(Continued)

FOREIGN PATENT DOCUMENTS

EP        0018229 A1    10/1980
EP        0370671 A2    5/1990
(Continued)

OTHER PUBLICATIONS

UK Intellectual Property Office, International Search Report for related UK Application No. GB1518099.5 dated Apr. 15, 2016.
(Continued)

*Primary Examiner* — Thomas J Williams

(57) ABSTRACT

A vehicle trailer brake system and method with a hydraulic control line and supplementary line arranged between a towing vehicle and a towed trailer, wherein the trailer braking system is actuated from the towing vehicle by controlling the hydraulic pressure in the control line and the supplementary line. The trailer brake system may be operated to actuate a trailer brake using a trailer-based hydraulic accumulator, to provide for relatively fast response time for the trailer brake.

14 Claims, 10 Drawing Sheets

(51) Int. Cl.
*B60T 13/14* (2006.01)
*B60T 13/66* (2006.01)
*B60T 13/68* (2006.01)
*B60T 7/04* (2006.01)
*B60T 8/171* (2006.01)

(52) U.S. Cl.
CPC ............ B60T 13/14 (2013.01); B60T 13/662 (2013.01); B60T 13/686 (2013.01); *B60T 2220/04* (2013.01); *B60T 2270/402* (2013.01); *B60T 2270/403* (2013.01)

(58) Field of Classification Search
CPC ...... B60T 13/141; B60T 13/148; B60T 13/22; B60T 13/662; B60T 13/686; B60T 17/221; B60T 17/225
USPC ................................ 303/3, 7, 8, 9, 9.61, 123
See application file for complete search history.

(56) References Cited

U.S. PATENT DOCUMENTS

| | | | | |
|---|---|---|---|---|
| 5,382,085 A | * | 1/1995 | Zbinden | B60T 13/74 303/10 |
| 5,511,860 A | * | 4/1996 | Wallestad | B60T 13/265 303/41 |
| 6,079,790 A | * | 6/2000 | Broome | B60T 8/00 137/625.64 |
| 2002/0185914 A1 | * | 12/2002 | Clay | B60G 17/0195 303/166 |
| 2002/0195870 A1 | | 12/2002 | Brunson et al. | |
| 2007/0102996 A1 | | 5/2007 | Kelly et al. | |
| 2014/0183935 A1 | * | 7/2014 | Harrison | B60T 8/1708 303/14 |
| 2014/0358395 A1 | * | 12/2014 | Harrison | B60T 8/1708 701/78 |

FOREIGN PATENT DOCUMENTS

| | | |
|---|---|---|
| GB | 2053397 A | 2/1981 |
| GB | 2153468 A | 8/1985 |
| GB | 2490925 A | 11/2012 |
| WO | 2011/072780 A1 | 6/2011 |
| WO | 2014/096159 A1 | 6/2014 |
| WO | 2014/180810 A1 | 11/2014 |

OTHER PUBLICATIONS

European Patent Office, International Search Report for International Patent Application No. PCT/EP2016/071819, dated Nov. 18, 2016.

\* cited by examiner

VEHICLE TRAILER BRAKE SYSTEM AND METHOD

BACKGROUND OF THE INVENTION

Field of the Invention

The present invention relates to a system and method for the operation of a vehicle trailer brake.

Description of Related Art

Many vehicles are often provided with attached trailers for the transportation of goods and materials. For large-scale use, and in particular in the area of agricultural tractors, such trailers may be provided with trailer-side braking systems to allow for safe control of the trailer, and to prevent jack-knifing or skidding of the trailer when braking.

In the EU, the vehicle braking requirements (RVBR) of the so-called "Mother Regulation" introduces increased safety requirements for the operation of trailer brake systems in the agricultural sector. In particular, agricultural trailers are required to have trailer braking systems responsive to user actuation, where such trailer braking systems must provide for improved response times, and have failsafe systems which act to brake the towed trailer in the event of a systems or communications fault with the towing vehicle.

Due to the relatively stringent requirements of the RVBR, currently-proposed hydraulic braking systems involve a relatively high degree of complexity. For example, the current trailer brake solution proposed by SAFIM S.p.A. includes a dedicated control lever and at least four separate control and communication lines to be connected between the towing vehicle and the towed trailer.

Pneumatic braking systems have also been proposed as a possible solution having reduced system complexity. However such systems require the installation of additional compressors to provide a pressurised air supply, thereby increasing the cost and weight of such solutions.

It is an object of the invention to provide a system and method which seeks to address the above problems, providing a trailer brake system having reduced cost and complexity of operation, while satisfying the regulation performance requirements.

SUMMARY OF THE INVENTION

Accordingly, there is provided a method of controlling a hydraulic trailer brake system using a hydraulic fluid supply provided on a vehicle, wherein a control line (CL) and a supplementary line (SL) are arranged between the vehicle and a vehicle trailer for supply of hydraulic fluid to and from the trailer, the method comprising the steps of:

monitoring the hydraulic fluid pressure in the CL and in the SL;

receiving a user braking input; and controlling the pressure of hydraulic fluid in the CL and in the SL to control the operation of the trailer brake system, wherein said controlling is based on a combination of the received user braking input and the detected pressure levels in the CL and SL.

As the trailer brake system can be controlled based on the pressure levels maintained in the CL and SL, accordingly the trailer brake can be controlled without the need for extra control lines between the vehicle and the trailer, and the extra cost and control complexity associated therewith.

It will be understood that the trailer brake system comprises at least one trailer main brake for the braking of the trailer, such a trailer main brake actuated through the supply of hydraulic fluid to a brake cylinder of the trailer main brake. In a preferred embodiment, the trailer brake system further comprises a trailer parking brake, preferably a spring brake which is biased to a closed or engaged position. In such embodiments, the SL is connected to a chamber of the parking spring brake such that a supply of hydraulic fluid to the parking spring brake acts to open or release the parking brake.

It will be understood that the user braking input may comprise a sensor output from a sensor arranged to monitor user brake controls, e.g. a brake pedal actuation level, an emergency stop button or kill switch status, a hand brake lever, etc.

Preferably, the trailer brake system comprises at least one trailer main brake for the braking of the trailer and a hydraulic fluid accumulator for the storage of a reservoir of hydraulic fluid on the trailer, wherein the method further comprises the step of:

actuating the trailer main brake by selectively connecting of the trailer accumulator to the trailer main brake to supply hydraulic fluid from the trailer accumulator to the trailer main brake, wherein said step of connecting is based at least in part on the SL pressure.

Using the SL pressure to control the connection of the accumulator to the trailer main brake allows for a relatively fast response time, as the stored hydraulic fluid in the accumulator can be connected directly to the main brake after a relatively small increase in SL pressure, and before the CL pressure has risen sufficiently to actuate the main brake. Further preferably, said step of connecting is additionally based at least in part on the CL pressure, and/or the pressure in the trailer main brake.

Preferably, said step of actuating the trailer main brake further comprises selectively connecting the CL to the trailer main brake to supply hydraulic fluid from the CL to the trailer main brake, wherein said step of connecting is based at least in part on the CL pressure.

Preferably, the method comprises the step of supplying hydraulic fluid to a trailer ACC using the CL, wherein said step of supplying is based on a pressure differential between the trailer accumulator and the CL.

As the CL pressure rises, fluid in the CL line can be used to both actuate the main brake and to re-fill the draining accumulator.

Preferably, a first electrohydraulic valve (EV1) is used to control pressure in the CL and a second electrohydraulic valve (EV2, EV2') is used to control pressure in the SL, wherein said step of controlling the pressure comprises piloting the respective EV1 and EV2 to selectively connect the CL and the SL to a hydraulic supply or hydraulic tank provided on the vehicle.

It will be understood that connecting the respective CL or SL to the hydraulic supply provides an increase in pressure, while connecting the CL or the SL to the tank provides a reduction in pressure. In addition, it will be understood that the valves EV1 and EV2 may comprise an intermediate closed state, to maintain a particular pressure level in the CL or SL.

The use of electrohydraulic valves for the controlling of the pressure in the CL and SL lines allows for the control scheme to be controlled using a controller, wherein the control conditions may be tuned based on variable factors such as type of vehicle, type of trailer, trailer weight or load status, etc. Preferably, the electrohydraulic valves each comprise proportional pressure reducer valves, having a first valve position connecting CL or SL to the hydraulic supply, a second intermediary valve position being closed, and a third valve position connecting CL or SL to the fluid tank. The valves are preferably biased to the third valve position.

Preferably, the method further comprises the steps of:
detecting a fault in the CL or in the SL, wherein
if a fault is detected in the CL, reducing the pressure in the SL to actuate the trailer main brake, and
if a fault is detected in the SL, increasing the pressure in the CL to actuate the trailer main brake.

The control method and the brake system are configured that if a fault, e.g. a brake or leakage, is detected in either of the lines, the control method acts to control the other of the lines to apply the trailer main brake. In the case of a fault in both of the lines, the system is constructed that the trailer will brake due to the action of the trailer accumulator on the main brake, and the biasing of a parking spring brake (if present).

Preferably, the method further comprises the steps of:
if a fault is detected in the CL, draining the CL to tank, and
if a fault is detected in the SL, draining the SL to tank.

Preferably, the method comprises the steps of:
monitoring an acceleration level of the vehicle, wherein said step of controlling the pressure in the CL and in the SL is at least in part based on the monitored acceleration.

As the acceleration or deceleration of the vehicle and vehicle trailer may affect the monitored pressure level in the CL and SL, accordingly the method is arranged to tune the operation of the control system to account for the variation in pressure levels due to vehicle acceleration/deceleration.

Preferably, the method comprises the steps of:
receiving an indication of the trailer weight, wherein said step of controlling the pressure in the CL and in the SL is at least in part based on the trailer weight.

As the braking force required to brake a vehicle trailer is partly dependent on the weight of the trailer, accordingly the method is arranged to tune the operation of the control system to account for any variation in trailer weight.

Preferably, the method comprises the steps of, on vehicle startup or on connection of a vehicle trailer to an operating vehicle:
increasing pressure in the CL to apply the trailer main brake and to supply hydraulic fluid to the trailer accumulator, and
when CL reaches a threshold pressure indicating that the accumulator is substantially full, reducing the pressure on the CL to a standby pressure level.

When the vehicle is initially started up, or when a trailer is coupled to a running vehicle, hydraulic fluid is supplied to the trailer via the CL to ensure that the trailer accumulator is fully supplied with fluid. Once the accumulator has been filled, the pressure in the CL may be reduced to a standby level to allow for system operation. It will be understood that the standby pressure may be of a level sufficient to release the trailer main brake.

Preferably, the method comprises the steps of:
receiving a user braking input to apply the trailer main brake, wherein the pressure in the CL and in the SL is controlled proportional to the level of the received user braking input.

The user braking input may comprise an indication of the level of actuation of a vehicle brake pedal. Accordingly, the pressure in the CL and SL may be adjusted to provide a trailer braking response corresponding to the level of braking input received from an operator, e.g. a relatively low actuation level of the braking input may require a relatively small change in pressure level and/or a relatively slow response, such that the trailer main brake may be actuated using the CL alone. Similarly, a relatively high or 100% actuation level may require a high braking force provided within a short response time. In such a case, the CL and SL pressures are controlled to instantly connect the trailer accumulator to the trailer main brake for relatively high or full actuation of the brake.

Preferably, the CL pressure is controlled to maintain a fill level of the trailer accumulator.

Preferably, the method comprises the steps of:
receiving a user braking input to apply the trailer main brake fully or to apply an emergency brake;
increasing SL pressure to connect the trailer accumulator to the trailer main brake to actuate the trailer main brake, and
increasing CL pressure to supply hydraulic fluid to the trailer main brake and to the trailer accumulator.

As the SL pressure level may be used to connect the trailer accumulator to the main brake, accordingly a relatively small increase in pressure on the SL can result in a near-instantaneous connection of the pressure stored in the accumulator to the main brake for fast action of the trailer brake. The SL may be maintained at a pressure of approximately 15 bar during vehicle operation, wherein a pressure of approximately 35 bar is sufficient to connect the trailer accumulator to the trailer main brake. By contrast, the CL may be maintained at a pressure level of approximately 1-2 bar during normal operation, rising to approximately 150 bar for full actuation of the trailer brakes. The trailer accumulator will be understood to retain a relatively high pressure level of hydraulic fluid when filled, e.g. approximately 150 bar. As a result, a rise in pressure on the SL of approximately 20 bar results in supply of stored hydraulic fluid of approximately 150 bar directly to the trailer main brake. It will be understood that the system is not limited to the exact levels described, which may be used as indicative of the relative pressure levels provided in the different elements of the system.

Preferably, the method comprises the steps of:
receiving a user braking input to release the trailer main brake;
reducing SL pressure to disconnect the trailer accumulator from the trailer main brake; and
connecting the CL to tank to drain the trailer main brake.

Preferably, the CL is connected to tank to drain the trailer main brake until the CL pressure reaches a standby level, and wherein the CL pressure is disconnected from the tank at said standby pressure level. Preferably, the standby pressure level for the CL is approximately 1-2 bar, while the standby level for the SL is approximately 15 bar.

In embodiments where the vehicle trailer comprises a trailer parking spring brake, the method further comprises the steps of:
receiving a user braking input to release a parking brake, and
increasing SL pressure to release the trailer parking spring brake.

It will be understood that the SL may be connected to a chamber of a trailer parking spring brake, wherein the actuation of the trailer parking spring brake is controlled directly based on the hydraulic pressure in the SL. In such a system, the parking brake is preferably biased to a closed or engaged position, such that connecting the SL to the tank or a sudden loss in pressure in the braking system is sufficient to allow the parking brake to close, to brake the trailer.

Preferably, the method further comprises the step of:
receiving a user braking input to apply a parking brake, and
connecting the SL to tank to drain the trailer parking spring brake of hydraulic fluid, to apply the parking brake.

In addition, there is provided a vehicle, preferably an agricultural tractor, comprising a controller arranged to implement the steps of the above method.

Furthermore, there is provided a computer-readable storage medium comprising computer-executable instructions that, when executed on a computer, perform the steps of the above method. Such a computer may comprise any suitable microprocessor or CPU, for example an electronic control unit (ECU) of a vehicle.

There is also provided a hydraulic brake control system for a vehicle, the brake control system providing a control line (CL) and a supplementary line (SL) for connection of a hydraulic fluid supply to a trailer brake system, the brake control system comprising:
a first electrohydraulic valve (EV1) to control hydraulic pressure in the CL; and a second electrohydraulic valve (EV2,EV2') to control hydraulic pressure in the SL,
wherein EV1 and EV2 are controlled based on user brake input and on the hydraulic pressure detected in both the CL and the SL.

Preferably, the brake control system further comprises a first pressure sensor provided on the CL to monitor the pressure level of the CL, and a second pressure sensor provided on the SL to monitor the pressure level of the SL.

Preferably, the brake control system further comprises a controller arranged to pilot EV1 and EV2, the controller communicatively coupled with the first and second pressure sensors to pilot EV1 and EV2 based at least in part on the monitored pressure levels of the CL and the SL.

It will be understood that the controller may be provided as a control module located in a housing common to EV1 and EV2. Alternatively, the controller may be provided as part of a vehicle electronic control unit system (ECU), for possible integration with other vehicle operating systems. Preferably, the controller is arranged to implement the step of the method as described above.

Preferably, the brake control system is arranged to be coupled to a trailer brake system having a trailer main brake and a hydraulic fluid accumulator for the storage of a reservoir of hydraulic fluid on the trailer, wherein EV2 is piloted such that SL pressure is used to control the connection of the trailer accumulator to the trailer main brake to actuate the trailer main brake using hydraulic fluid stored in the trailer accumulator.

Preferably, EV1 is piloted such that CL pressure may be used to actuate the trailer main brake. In addition, EV1 is piloted such that CL pressure is used to connect the CL to the trailer accumulator, to supply hydraulic fluid from the hydraulic fluid supply to fill the trailer accumulator.

Preferably, the controller is arranged to monitor the pressure in the CL and in the SL, and to determine the presence of a fault in the CL or the SL, wherein
if a fault is detected in CL, EV2 is piloted to reduce pressure in SL to actuate the trailer brake, and
if a fault is detected in SL, EV1 is piloted to increase pressure in CL to actuate the trailer brake.

Preferably, is a fault is detected in one or both of CL or SL, the associated one of said EV1 or EV2 is piloted to connect the CL or SL having the fault to tank to drain the line.

Preferably, the brake control system comprises an accelerometer to monitor vehicle acceleration, wherein said EV1 and EV2 are further controlled based at least in part on vehicle acceleration.

Preferably, the CL is arranged to be selectively coupled with a trailer accumulator and with a trailer main brake.

Preferably, the SL is arranged to be coupled with a trailer parking spring brake.

Preferably, the brake control system further comprises a third electrohydraulic valve (EV3) to control hydraulic pressure in the SL, wherein EV3 is controlled based on user brake input and on the hydraulic pressure detected in both the CL and the SL, EV3 comprising an additional mechanical actuation device, such as a push-button.

Preferably, EV3 is arranged to allow SL to drain to tank T.

Preferably, the brake control system further comprises at least one dedicated pressure regulator valve. Preferably, a first pressure regulator valve R1 acts to regulate the pressure from the supply P to a second electrohydraulic valve EV2'. Preferably, a second pressure regulator valve R2 acts to regulate the pressure between first electrohydraulic valve EV1 and tank T.

There is further provided a trailer valve module for a trailer brake system, wherein the trailer valve module comprises:
a CL connection port and an SL connection port for respectively receiving a CL and an SL from a vehicle brake control system,
an accumulator connection port for receiving an trailer accumulator connection, and
a trailer brake connection port for connecting to a main brake of a trailer.

Preferably, the trailer valve module further comprises a spring brake connection port for connecting to a parking spring brake of a trailer, wherein the SL connection port is directly connected to the spring brake connection port.

Preferably, the trailer valve module further comprises:
a first distributor valve GV1 to control the connection between the CL connection port to the accumulator connection port; and
a second distributor valve PV1 to control the connection between the CL connection port, the accumulator connection port, and the trailer brake connection port.

Preferably, the first distributor valve GV1 is controlled at least in part based on a pressure differential between the CL and the accumulator.

Preferably, the second distributor valve PV1 is controlled at least in part based on the pressure of the SL, further preferably is controlled at least in part based on the pressure of the CL and the trailer brake connection port.

Preferably, the trailer valve module further comprises a throttle valve arranged at said CL connection port, wherein said throttle valve is configured to be piloted based on the weight of a trailer. The trailer valve module may comprise a trailer weight sensor coupled to the throttle valve, or the throttle valve may be controlled based on a user input which defines a trailer load level.

In addition, there is provided a vehicle, preferably an agricultural tractor, comprising a hydraulic brake control system as described above. There is also provided a vehicle trailer for coupling to a vehicle comprising a trailer valve module as described above.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
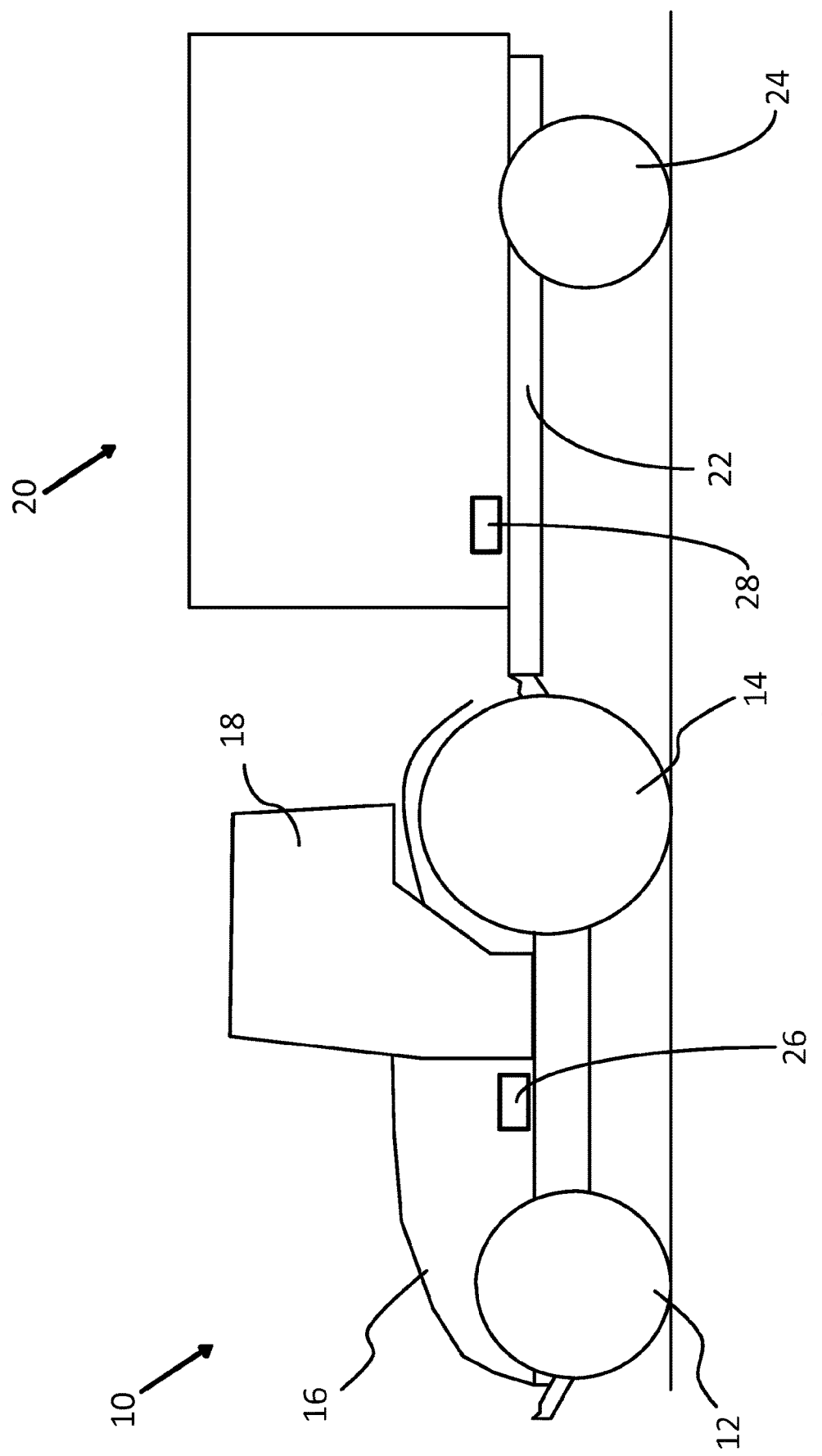
FIG. 1 is an illustration of a tractor and trailer according to an embodiment of the invention.

With reference to FIG. 1 a vehicle in the form of an agricultural tractor is indicated at 10. The tractor 10 comprises front wheels 12 and rear wheels 14, a forward engine section 16 and a cab section 18. The tractor 10 is coupled with a towed trailer 20. The trailer 20 comprises a trailer body 22, and at least one pair of wheels 24. A trailer brake system is provided on the trailer 20, which is connected with a hydraulic brake control system provided on the tractor 10. It will be understood that hydraulic fluid lines (not shown) may extend between the tractor 10 and the trailer 20, for actuation of the braking system of the trailer 20.

Figure 2:
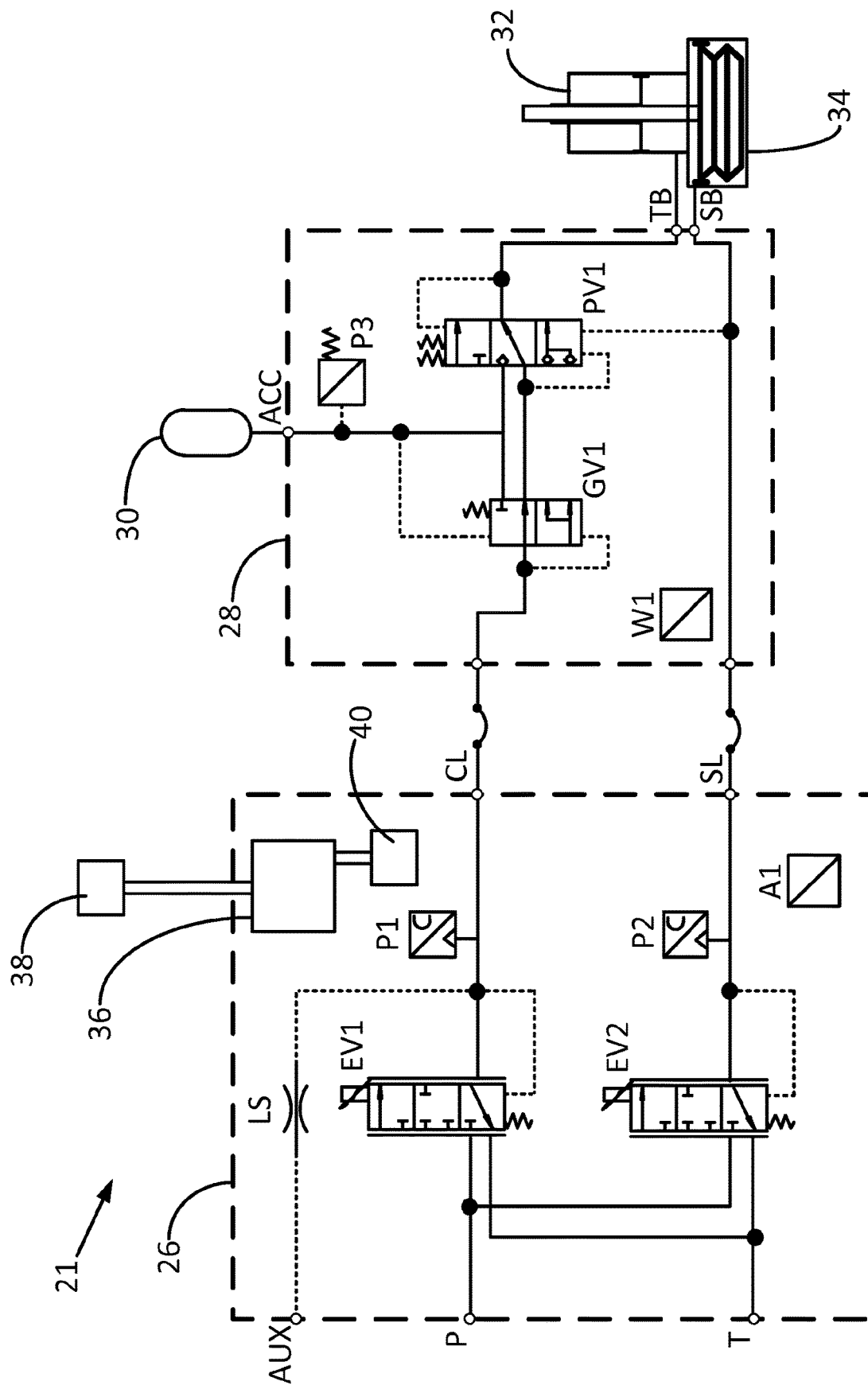
FIG. 2 is a schematic diagram of a vehicle trailer brake system 21 according to an embodiment of the invention, configured for a load sensing hydraulic system.

A schematic illustration of a vehicle trailer brake system 21 according to the invention is provided in FIG. 2. The vehicle trailer brake system 21 comprises a brake control system indicated by the outline 26, the brake control system 26 provided on the tractor 10. The brake control system 26 comprises ports for the connection of a hydraulic supply P, a hydraulic tank T, and an outlet port for a load-sensing configuration LS. The brake control system 26 further comprises connection ports for a hydraulic control line CL and a hydraulic supplementary line SL.

In the brake control system 26, first and second electro-hydraulic valves EV1,EV2 selectively connect the respective CL and SL to the hydraulic supply P and tank T. In the embodiment shown in FIG. 2, the valves EV1 and EV2 comprise 3/2 proportional distributor valves, having an intermediary position where the valve is fully closed. For clarity purposes, the valves EV1, EV2 are shown without the intermediary position in FIGS. 4, 6 & 7, but it will be understood that any suitable configuration of valve may be used.

The vehicle trailer brake system 21 further comprises a controller 36 which is arranged to pilot the electrohydraulic valves EV1, EV2. The controller 36 may be located within the brake control system 26, as shown in FIG. 2. Alternatively, the controller 36 may be provided as a module of a vehicle electronic control unit (ECU) located elsewhere on the tractor 10, and arranged to communicate with the brake control system 26 and the valves EV1, EV2.

The brake control system 26 further comprises first and second pressure sensors P1, P2, which are provided on the respective CL and SL lines. The pressure sensors P1, P2 are arranged to monitor the pressure in the CL and in the SL, and to provide an indication of the monitored pressure level to the controller 36. Additionally, the brake control system 26 comprises an accelerometer A1, which is arranged to monitor the acceleration or deceleration of the tractor 10. Similar to the controller 36, the accelerometer A1 may be located within the brake control system 26, as shown in FIG. 2, or as a separate element located distal from the brake control system 26, and arranged to communicate with the controller 36.

The controller 36 is further arranged to receive user braking inputs in the form of a desired braking level, or an emergency stop request. Such inputs may be received by monitoring the actuation level of brake pedals of the tractor 10, or the status of an emergency stop button in the tractor cab 18.

In addition to the brake control system 26 provided on the tractor 10, the trailer 20 is provided with a trailer valve module indicated by the outline 28. The CL and the SL from the brake control system 26 are connected via a hydraulic fluid connection to the trailer valve module 28. The trailer 20 is further provided with a hydraulic accumulator 30, a trailer main brake 32, and a connected parking spring brake 34.

The trailer valve module 28 comprises connection ports for the CL and the SL, in addition to ports for the connection to the hydraulic accumulator 30 (indicated as ACC), to the trailer main brake 32 (indicated as TB), and to the parking spring brake 34 (indicated as SB). In the illustrated embodiment, the trailer valve module 28 further comprises a trailer weight sensor W1, which is arranged to detect the load level of the trailer 20. While the weight sensor W1 of FIG. 2 is shown as located within the trailer valve module 28, it will be understood that the weight sensor W1 may be provided as a separate element located outside of the trailer valve module 28, and arranged to communicate with the controller 36.

The trailer valve module 28 further comprises a first distributor valve GV1 and a second distributor valve PV1. GV1 is a 3/2 proportional distributor which is connected to the CL, wherein GV1 is arranged to supply the trailer accumulator line ACC when the pressure in the CL is higher than the pressure in the accumulator line ACC. GV1 is arranged to connect the CL to proportional distributor valve PV1 in both valve positions.

PV1 is a 3/3 proportional distributor valve, which selectively connects the CL, the accumulator line ACC, and the trailer main brake line TB. PV1 is piloted by the CL pressure, the SL pressure, and the pressure in the TB line.

In a first valve position, seen as the uppermost valve position in FIG. 2, PV1 acts to connect the accumulator line ACC with the trailer brake line TB to actuate the trailer brake. In a second valve position, seen as the middle valve position in FIG. 2, PV1 closes the connection to the accumulator line ACC and connects the main brake line TB with the CL through the valve GV1. In this second position, the line TB can be connected with either hydraulic supply P or tank T through appropriate control of valve EV1, such that the actuators for the trailer main brake 32 may be filled or drained as required. In a third valve position, seen as the bottommost valve position in FIG. 2, PV1 acts to connect the brake line TB with both of the accumulator line ACC and the CL line. In this position, the accumulator 30 will actuate the trailer main brake 32 before the pressure on the CL has risen sufficiently to actuate the trailer brake, due to the relatively close location of the accumulator 30 on the trailer 20.

Through the use of a trailer-based accumulator, the vehicle trailer braking system 21 can provide for actuation of a trailer main brake with an improved response time, due to the positioning of a relatively high-pressure supply of fluid close to the main brake actuators, when compared to systems wherein a trailer brake is actuated solely using fluid supplied from a vehicle-based hydraulic supply.

The trailer valve module 28 further comprises a pressure sensor P3 which is provided connected to the ACC line to monitor the pressure level in the accumulator 30. The sensor P3 is arranged to communicate a warning signal to a tractor operator in the event of a low pressure in the accumulator 30.

The controller 36 pilots the valves EV1, EV2 based at least in part on the received user braking input, the monitored pressure level in the CL and in the SL, the monitored acceleration level of the vehicle 10 and trailer 20, and the monitored load level of the trailer 20. Through appropriate control of the valves EV1, EV2, the pressure level in the CL and the SL can be adjusted to remotely control the actuation of the trailer braking system via the trailer valve module 28, without the need for additional control lines.

The parking spring brake 34 is biased to a closed or engaged position, wherein the actuator of the spring brake 34 is connected directly to the supplemental line SL via line SB. Accordingly, when SL is drained to tank T, the parking brake 34 is closed due to a lack of pressure in SB. Conversely, when SL is supplied with pressure, the parking brake 35 is opened as hydraulic fluid is supplied via SB. As a result, the parking brake 34 can be controlled by operation of the valve EV2, to control the pressure in the line SL.

The operation of the vehicle trailer braking system 21 is now described, with reference to FIGS. 3-7. Initially, when the vehicle engine is switched off, the valves EV1 and EV2 are biased to connect the CL and the SL to tank T, as shown in FIG. 2. If the trailer 20 is equipped with a parking spring brake 34 as shown in FIG. 2, this results in engagement of the parking brake 34 due to the training of hydraulic fluid from SB. Dependent on the duration of inactivity of the engine, the fluid stored in the trailer accumulator 30 may be near empty, with the corresponding pressure in the accumulator ACC close to 0 bar. In the event of some pressure in ACC, this may aid in the actuation of the main brake 32 to brake the trailer 20.

Figure 3:
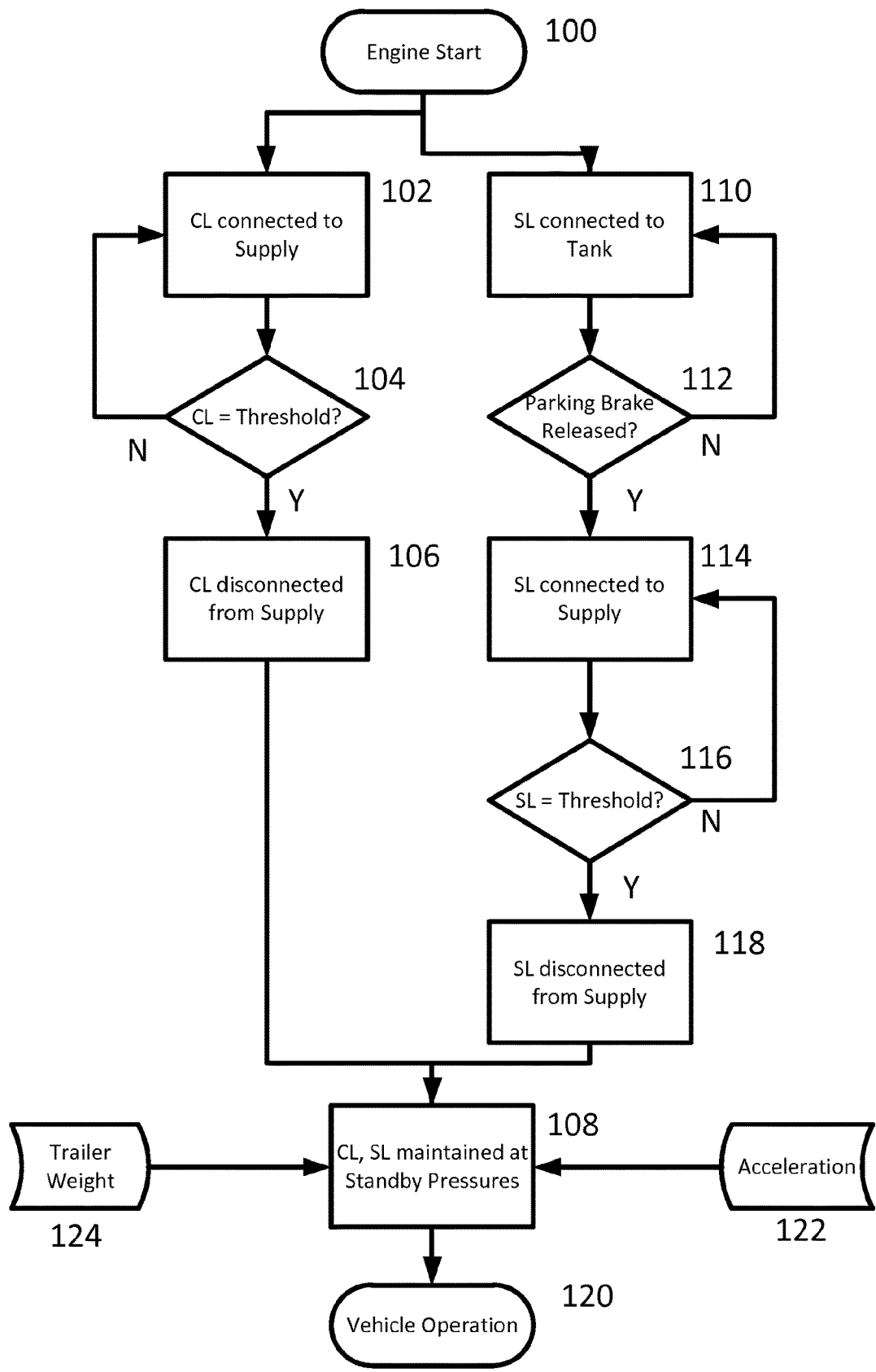
FIG. 3 is a process diagram of the start-up procedure for the system of FIG. 2.

On starting the engine, step 100 FIG. 3, the controller 36 is operable to pilot the valve EV1 to connect CL to supply P, step 102. By connecting CL to supply P, hydraulic fluid will be supplied to the trailer valve module 28 to brake the trailer main brake 32 through TB. In addition, as the pressure in CL will be greater than the pressure in the accumulator line ACC, valve GV1 will be piloted such that CL supplies the trailer accumulator 30. The controller 36 continues to supply the accumulator 30 through CL until the pressure sensor P1 indicates that the pressure in CL reaches a threshold value which indicates that the trailer accumulator 30 is substantially full, preferably approximately 150 bar, step 106. Upon reaching this threshold value, CL is disconnected from the supply P, step 108. At this point, the valve EV1 is piloted such that CL is maintained at a standby level, step 110, wherein CL may be connected to supply P, to tank T, or positioned in the intermediate closed position of the valve EV1. In a preferred aspect, the pressure level in CL is maintained at a level suitable to release the main brake 32, preferably approximately 1-2 bar.

Similarly, as the engine is started, step 100, the controller 36 pilots valve EV2 to connect line SL to tank, step 110. This acts to drain the parking spring brake 34 of the trailer 20 through the port SB, such that the parking spring brake 34 engages to brake the trailer 20. The controller 36 is arranged to monitor for user input to release the parking brake, step 112. Once the parking brake is released by the user, EV2 is piloted such that SL is then connected to the supply P, step 114, to supply hydraulic fluid to the parking spring brake 34. Fluid is supplied to the parking spring brake 34 until the pressure level in SL reaches a threshold level sufficient to release the parking brake 34, step 116. In a preferred aspect, such a pressure level is approximately 15 bar. Once the threshold level is reached, and the parking spring brake 34 released, SL is disconnected from the supply P by piloting the valve EV2 to the intermediate closed position, step 118. The controller 36 then acts to control the positioning of the valve EV2 to maintain the pressure in the SL line at the standby pressure of approximately 15 bar, step 108. The tractor 10 and trailer 20 is then ready for normal vehicle operation, step 120.

While the controller 36 is arranged to maintain the respective standby pressures in CL and in SL through appropriate control of the valves EV1 and EV2, it will be understood that the operation of the vehicle trailer braking system 21 and the associated trailer valve module 28, both with regard to the standby pressure level and to general operation, may be adjusted based on additional factors.

In one aspect, the controller 36 operation may be adjusted based on the measured acceleration or deceleration of the tractor 10 and trailer 20, as the acceleration or deceleration force may result in variations in the monitored pressure levels in the hydraulic lines of the system, due to motion of the hydraulic fluid. In this case, the controller 36 is arranged to receive a measure of the acceleration or deceleration of the tractor 10 and trailer 20, step 122, which is received from accelerometer sensor A1. The controller 36 is then arranged to tune the operation of the system, which may include adjusting the level of the standby pressures monitored in CL and SL.

In an additional or alternative aspect, the operation of the controller 36 may be adjusted based on the load level of the trailer 20, step 124, which may be measured by monitoring the output of the weight sensor W1, or by receiving a user input defining a trailer load level. As the braking force required to stop a fully-loaded trailer can be significantly greater than the braking force required to stop an empty trailer, accordingly the system may be tuned to apply greater actuation levels for the trailer brake 32.

Figure 4:
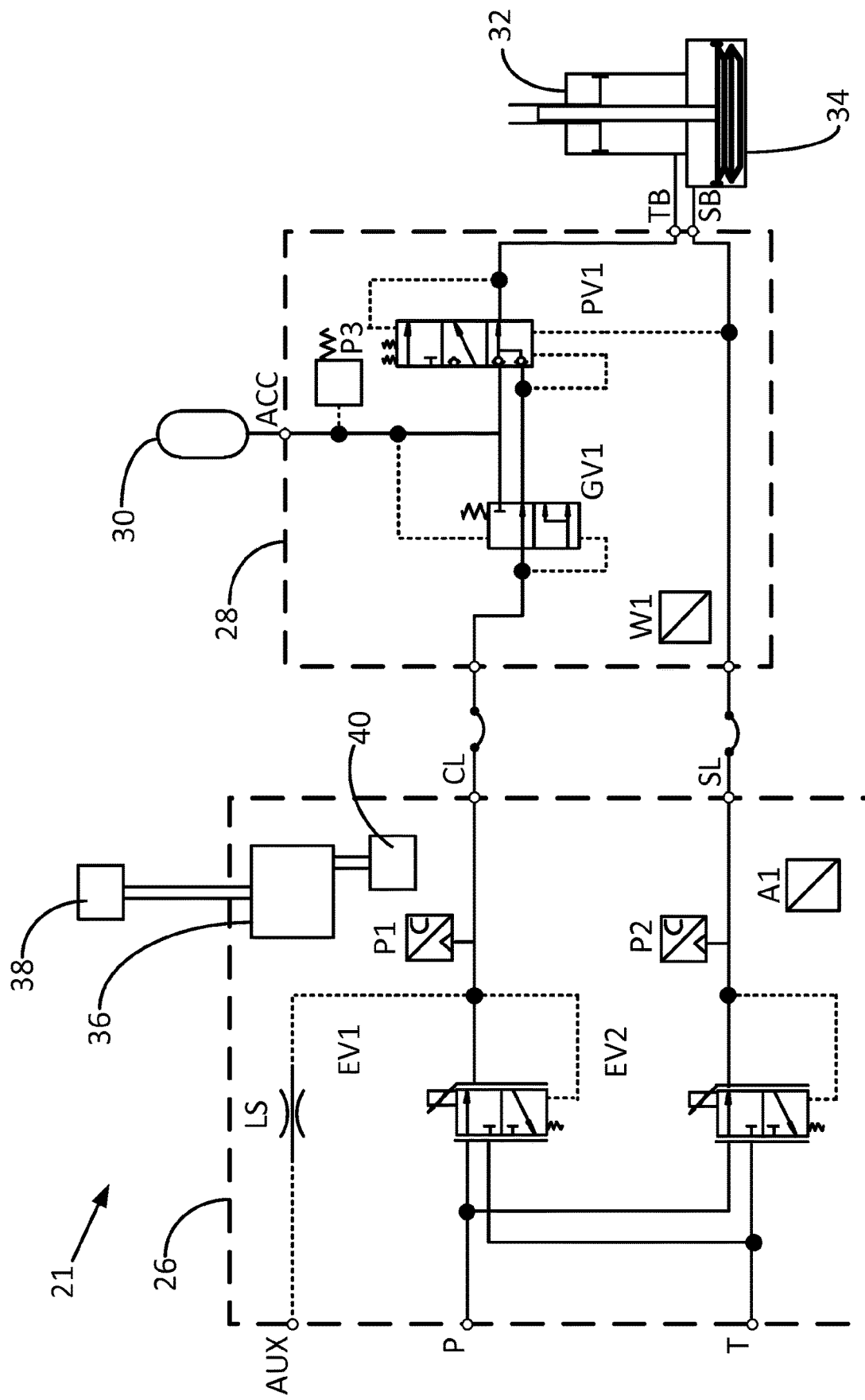
FIG. 4 is a schematic diagram of the system of FIG. 2 upon full actuation of the main brakes.
Figure 5:
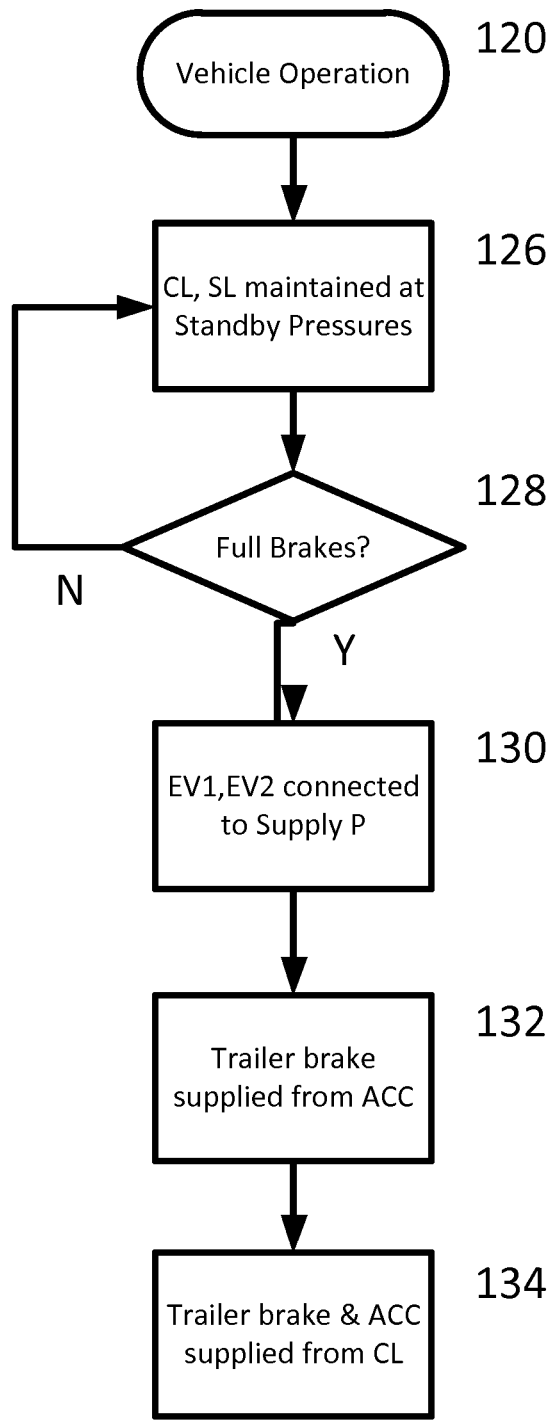
FIG. 5 is a process diagram for the full actuation of the trailer brake of FIG. 4.

With reference to FIGS. 4 & 5, the process during full actuation of the main brake, or the actuation of an emergency brake, is shown. During vehicle operation, step 120, as shown in FIG. 3, the CL and the SL are maintained at the appropriate standby pressures, step 122, through control of the valves EV1 and EV2. When the controller 36 detects that the main brakes of the tractor 10 have been fully actuated, or an emergency stop has been requested from the tractor operator, step 124, the controller 36 pilots the valves EV1, EV2 to connect both the CL and SL to the supply P, step 130. Accordingly, the pressure in the CL increases to a maximum of preferably approximately 150 bar, and the pressure in the SL increases to a maximum of preferably approximately 35 bar.

The trailer valve module 28 is configured such that the SL line acts to pilot the valve PV1 to the third bottommost valve position, to connect the line ACC with the line TB, such that the stored hydraulic fluid in the accumulator 30 actuates the trailer main brake 32, step 132. As the pressure in the SL line is maintained at a standby pressure of 15 bar during normal operation, the SL line pressure will reach the maximum pressure of 35 bar before the CL line increased from 1-2 bar to the maximum of 150 bar. Accordingly, the hydraulic fluid stored in the accumulator 30, which is preferably maintained at a pressure of approximately 150 bar, is used to actuate the trailer main brake 32 with a relatively fast response time.

As the pressure in the CL rises, and as the pressure across the valve PV1 stabilises, the valve PV1 returns to the middle position, such that the CL acts to supply the line TB to continue to brake the trailer 20, step 134. In addition, as the pressure in ACC falls and the pressure in CL rises, the valve GV1 switches to supply the accumulator 30 from the CL.

In the event of a partial actuation of the tractor brakes, the controller 36 is operable to pilot the valves EV1, EV2 in proportion to the level of brake actuation, such that the pressure in the CL and in the SL is adjusted accordingly. For example, depending on the level of brake actuation, the pressure in the CL may be piloted to a value between 2-150 bar, while the SL may be piloted to a value between 15-35 bar, to allow for appropriate actuation of the trailer brake 32. In addition, and as described above in relation to FIG. 3, such levels of pressure of CL and SL may be adjusted based on the monitored vehicle acceleration or deceleration, and on the load level of the trailer 20.

Accordingly, the vehicle trailer brake system 21 is arranged to provide a relatively fast braking response by appropriate control of the pressure levels in the CL and in the SL, to utilise an on-trailer accumulator for trailer brake actuation. Such a system provides a significant improvement over prior art systems, due to the combination of a reduction in the number of additional components and control lines needed for operation of the system, as well as a relatively fast response time for an emergency brake or full brake actuation.

In addition, the vehicle trailer brake system 21 is configured to safely brake the trailer 20 in the event of a fault or failure in either of the CL or the SL.

Figure 6:
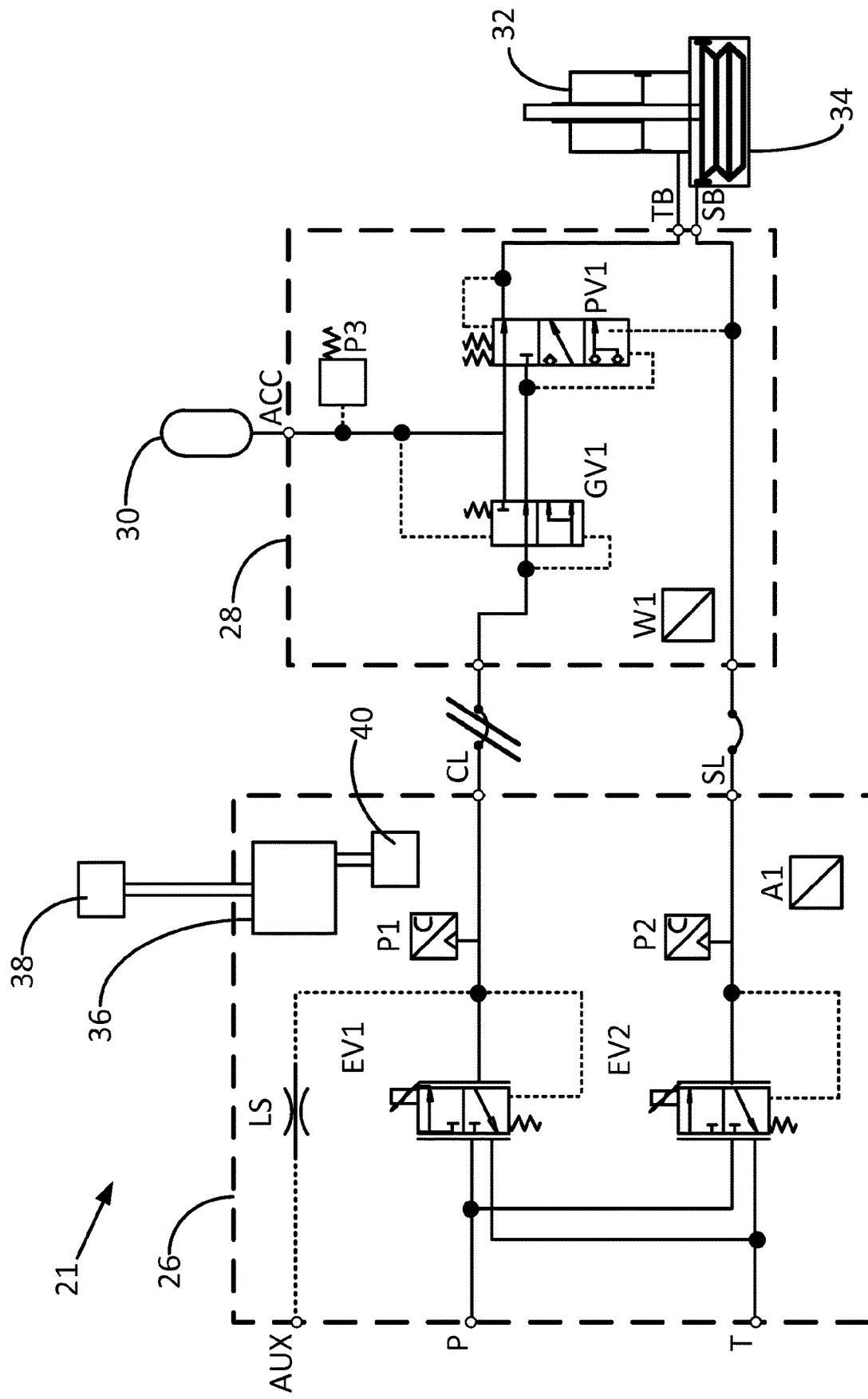
FIG. 6 is a schematic diagram of the system of FIG. 2 in the case of a fault on the CL line.

With reference to FIG. 6, the procedure for a fault in the CL is illustrated. In this instance, the engine is running, and the user actuates the main brake of the tractor 10. In the event of a fault on the CL, such as a leak or a fracture, the sensor P1 detects a falling pressure in the CL line. On detection of such a fault in CL, the controller 36 is operable to pilot EV1 and EV2 to connect CL and SL to tank T, as shown in FIG. 6. By connecting SL to tank, the pressure in SL drops relatively quickly, preferably to under 10-12 bar within 2 seconds of piloting EV2. Such a relatively low pressure in SL switches the valve PV1 to the uppermost position, wherein ACC is connected to TB, such that the accumulator 30 is used to actuate the trailer main brake 32 to brake the trailer 20. In addition, the relatively low pressure of SL results in a low SB pressure, which actuates the parking spring brake 34 to further brake the trailer 20.

Figure 7:
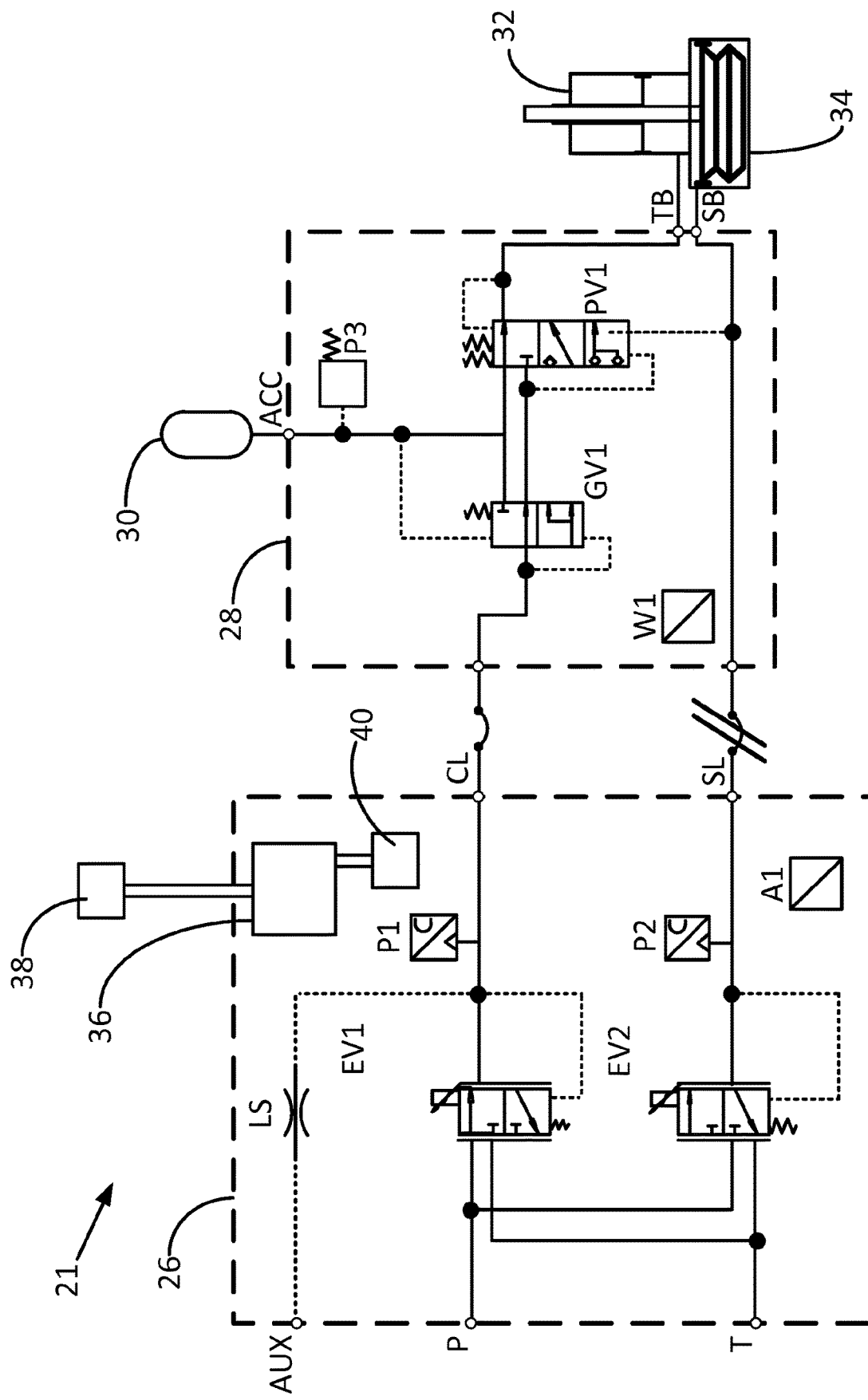
FIG. 7 is a schematic diagram of the system of FIG. 2 in the case of a fault on the SL line.

With reference to FIG. 7, the procedure for a fault in the SL is illustrated. In this instance, the engine is running, and the user actuates the main brake of the tractor 10. In the event of a fault on the SL, such as a leak or a fracture, the sensor P2 detects a falling pressure in the SL line. On detection of such a fault in SL, the controller 36 is operable to pilot EV2 to connect SL to tank T, and to pilot EV1 to connect CL to supply P, as shown in FIG. 7. As the SL pressure drops due to the presence of the fault, the valve PV1 is switched to the first position to connect ACC to TB, to actuate the trailer main brake 32 using the fluid stored in the accumulator 30. In addition, the CL will continue to supply fluid to the TB from the supply P. In embodiments equipped with a parking spring brake 34, the fall in pressure in SL will further act to actuate the parking spring brake 34 due to the fall in pressure in TB.

It will be understood that other embodiments of the invention may provide for an alternative implementation of a trailer parking brake, for example a trailer having a parking brake not actuated by the line SL, or even a trailer not comprising a parking brake. However, it will be understood that the system is arranged to operate to provide for the actuation of a trailer main brake with or without the presence of a connected parking spring brake as described in the above embodiments.

Figure 8:
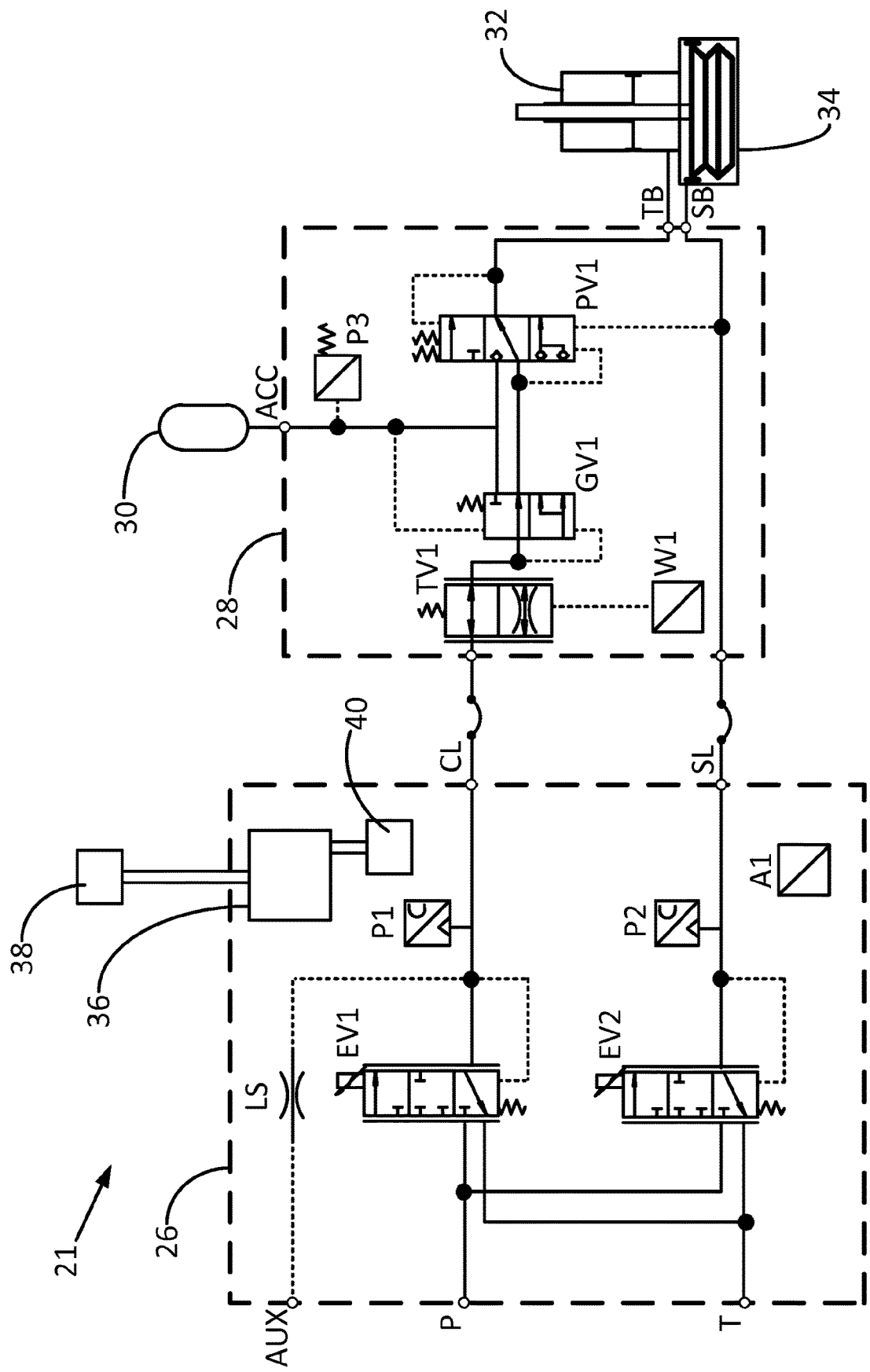
FIG. 8 is a schematic diagram of a vehicle trailer brake system according to a further embodiment of the invention, having a throttle valve system.

In a further aspect, it will be understood that the various sensors P1, P2, P3, A1, W1 may be arranged to communicate with the controller 36 using any suitable communication system, e.g. wired or wireless communication. In a further alternative, the weight sensor W1 may be configured as part of a mechanical system. With reference to the embodiment shown in FIG. 8, the trailer valve module 28 further comprises a throttle valve TV1 provided at the input from the CL line. The throttle valve TV1 acts as a mechanical proportional valve, which regulates the pressure received from the CL line based on the weight of the trailer 20. In the embodiment shown in FIG. 8, the throttle valve TV1 is piloted by the weight sensor W1, such that the braking responsiveness of the system can be tuned based on the trailer weight. In an alternative configuration, the throttle valve TV1 may be directly piloted by the weight of the trailer 20, such that a separate weight sensor W1 is not required for the trailer valve module 28.

In addition, the controller 36 may be able to receive further pre-programmed or user-definable inputs, or the output of additional sensor systems, to allow for further tuning of the responsiveness of the braking system, e.g. the type and weight of the towing tractor 10, the type or weight of the trailer 20 being towed, information regarding weather conditions or ground conditions, etc. Such additional information can allow for the responsiveness of the braking system to be adjusted for improved performance during vehicle operation. Additionally or alternatively, the controller 36 may receive inputs from a vehicle anti-lock braking system (ABS), which can act to modulate the braking response of the braking system to prevent the wheels from locking up and avoiding uncontrolled skidding.

It will be understood that the brake control system 26 may be provided within a housing, such that the brake control system 26 is provided as a module which can be easily installed on a vehicle or removed for a service or replacement operation. Similarly, the trailer valve module 28 may be provided within a housing for ease of installation and service on a trailer 20. It will be further understood that the vehicle brake control system 26 may be used in combination with a trailer 20 having only a single hydraulic line. In such a situation, the controller 36 is operable to detect or to receive a user input that only a single hydraulic line is to be used, which is provided as the CL line of the brake control system 26. Accordingly, the trailer main brake of such a trailer is arranged to be actuated using hydraulic fluid supplied via the line CL. Similarly, the vehicle brake control system 26 may be used in combination with a trailer 20 not having a trailer accumulator 30. For such a system, the trailer main brake of such a trailer is arranged to be actuated using hydraulic fluid supplied via the line CL.

Accordingly, an advantage of the system of the invention is that the same vehicle brake control system 26 may be utilised for a number of different tractor designs, wherein the responsiveness of the system may be parameterised through appropriate operation of the controller 36, which may be re-programmed dependent on the type of tractor used. In addition, the vehicle brake control system 26 may be arranged to be operable both with prior art trailer designs, or with trailers comprising a trailer valve module 28 as described above.

Additionally or alternatively, the system can be parameterised based on an identification of the type of trailer used. The trailer may be provided with an identifier, e.g. an RFID tag, which can be detected by a sensor connected to the braking system. The identifier can provide information regarding the type of trailer used, trailer weight, etc. Alternatively, an operator can input details of the type of trailer used, and other associated information.

Figure 9:
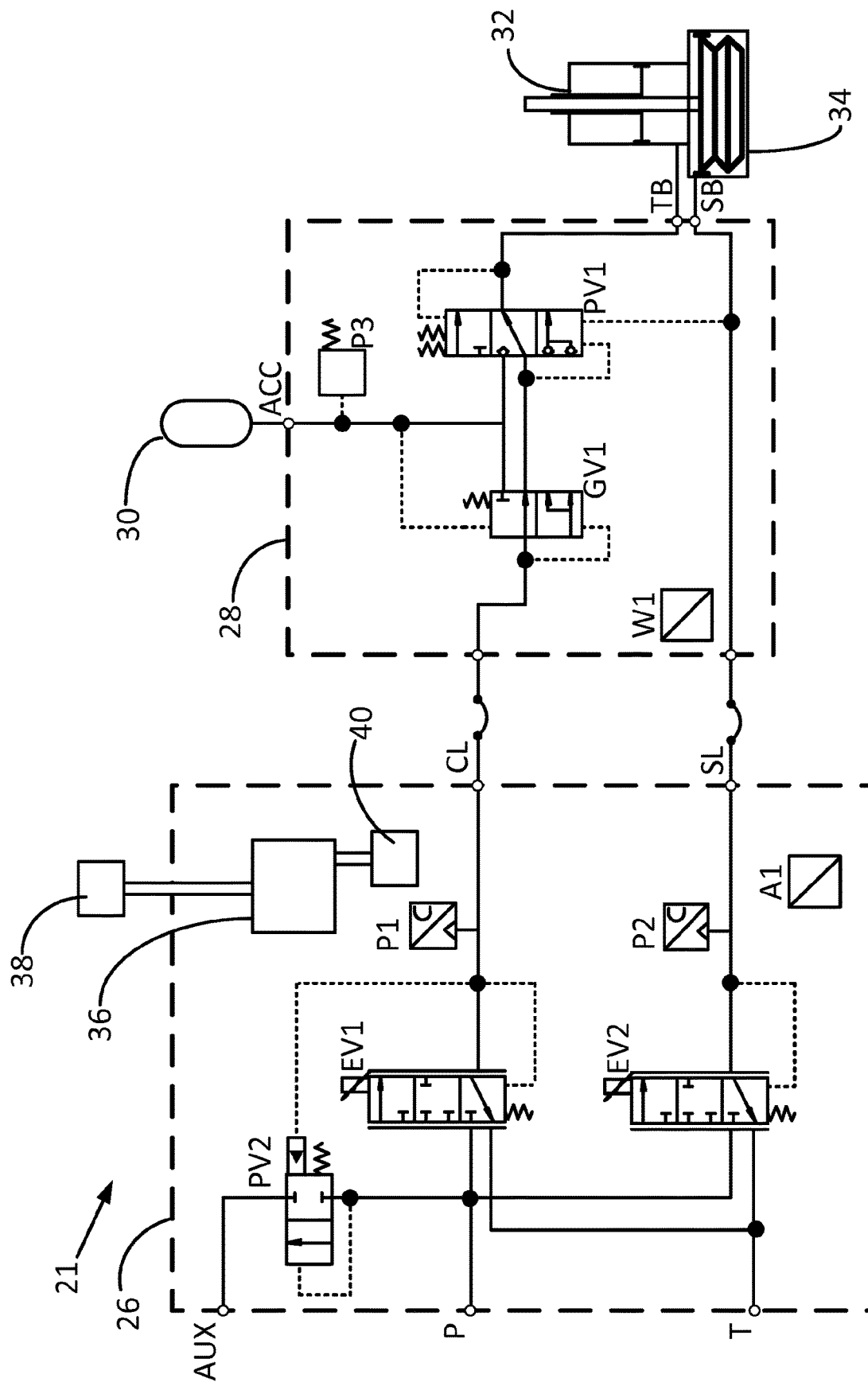
FIG. 9 is a schematic diagram of a vehicle trailer brake system according to a further embodiment of the invention, configured for an open centre hydraulic system.

In the embodiment of FIG. 2, the valve EV1 is further connected to throttle valve LS, which is coupled with port AUX to allow for load sensing operation of the brake control system 26. Accordingly, while FIGS. 2 and 4-7 illustrate an embodiment of the invention when used in a load-sensing configuration, it will be understood that the brake control system may be modified for use in other hydraulic system configurations. For example, FIG. 9 shows the brake control system of FIG. 2 for use in an open centre hydraulic system, wherein the throttle valve LS is replaced with a proportional distributor valve PV2.

Figure 10:
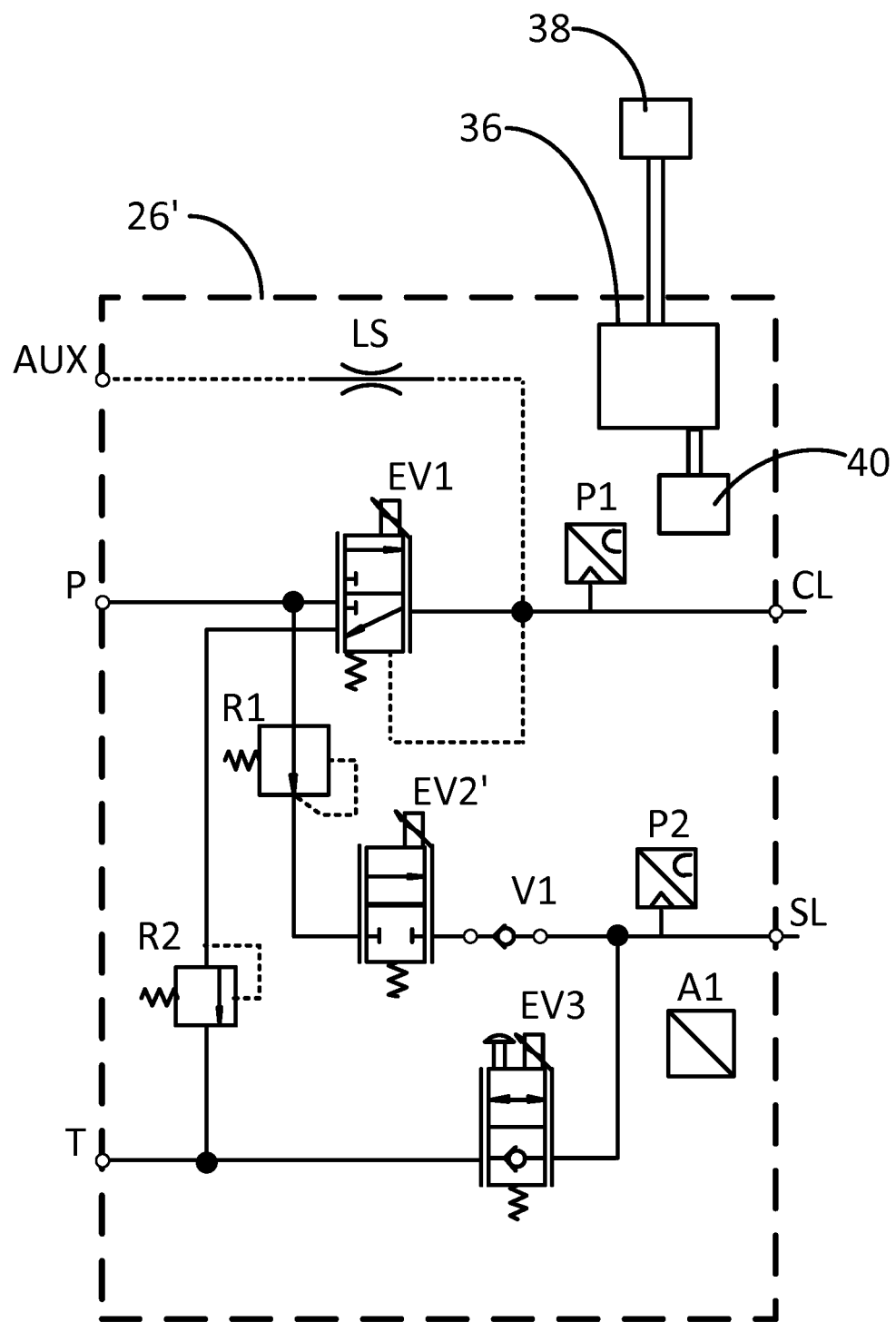
FIG. 10 is a schematic diagram of a further embodiment of a brake control system according to the invention.

A further embodiment of a brake control system according to the invention is illustrated in FIG. 10, indicated by the outline 26'. Elements common to the embodiments of brake control system 26 as described above retain the same reference numerals.

In the embodiment of FIG. 10, previous 3/2 proportional distributor electrohydraulic valve EV2 is replaced with one-way valve electrohydraulic valve EV2' and non-return valve V1, to connect supplementary line SL with supply P. A dedicated pressure regulator valve R1 is provided between supply P and the input to valve EV2', to ensure that an accurate pressure level from the supply is provided to EV2'. Preferably, R1 is configured at a pressure of approximately 21 bar from the supply P to EV2'.

A further dedicated pressure regulator valve R2 is provided on the output of valve EV1 to tank T, to ensure a precise regulation of the drain pressure from EV1. Preferably, R2 is configured at a pressure of approximately 2 bar on the output port of EV1.

An additional electrohydraulic valve EV3 is provided connected between supplementary line SL and tank T, to allow for drainage of the SL line. EV3 can be operated by the controller 36 to regulate the drainage of SL, in line with the method described above. EV3 is biased to a non-return position, wherein SL is not allowed to drain to tank T. It will be understood that, similar to the embodiments described above, EV2' and EV3 may comprise 3/2 proportional distributor valves, having an intermediary position where the valves are fully closed.

To allow for system operation in the event of an electrical failure, EV3 can be mechanically actuated by way of a push-button, which may be accessible by an operator in the cab 18. Such a push-button operation of EV3 allows for the drainage of the SL line by the operator.

It will be understood that the individual features shown in the embodiment of FIG. 10, e.g. the configuration of EV2', EV3 and V1; the first pressure regulator R1; or the second pressure regulator R2, may be used in any of the other embodiments of brake control system as described above.

The invention is not limited to the embodiments described herein, and may be modified or adapted without departing from the scope of the present invention.

The invention claimed is:

1. A method of controlling a hydraulic trailer brake system using a hydraulic fluid supply provided on a vehicle, wherein a control line (CL) and a supplementary line (SL) are arranged between the vehicle and a vehicle trailer for supply of hydraulic fluid to and from the trailer, the method comprising the steps of:
   monitoring the hydraulic fluid pressure in the CL and in the SL;
   receiving a user braking input;
   controlling the pressure of hydraulic fluid in the CL and in the SL to control the operation of the trailer brake system, wherein said controlling is based on a combination of the received user braking input and the hydraulic fluid pressure in the CL and SL; and
   supplying hydraulic fluid to a trailer accumulator using the CL, wherein said step of supplying is based on a pressure differential between the trailer accumulator and the CL.

2. The method of claim 1, wherein the trailer brake system comprises at least one trailer main brake for the braking of the trailer and a hydraulic fluid accumulator for the storage of a reservoir of hydraulic fluid on the trailer, wherein the method further comprises the step of:
   actuating the trailer main brake by selectively connecting of the trailer accumulator to the trailer main brake to supply hydraulic fluid from the trailer accumulator to the trailer main brake, wherein said step of connecting is based at least in part on the SL pressure.

3. The method of claim 2, wherein said step of actuating the trailer main brake further comprises selectively connecting the CL to the trailer main brake to supply hydraulic fluid from the CL to the trailer main brake, wherein said step of connecting is based at least in part on the CL pressure.

4. A non-transitory computer-readable storage medium comprising computer-executable instructions that, when executed on a computer, perform the method as claimed in claim 1.

5. The method of claim 1, wherein a first electrohydraulic valve (EV1) is used to control pressure in the CL and a second electrohydraulic valve (EV2) is used to control pressure in the SL, wherein said step of controlling the pressure comprises piloting the respective EV1 and EV2 to selectively connect the CL and the SL to a hydraulic supply or hydraulic tank provided on the vehicle.

6. The method of claim 1, wherein the method further comprises the steps of:
   detecting a fault in the CL or in the SL, wherein
   if a fault is detected in the CL, reducing the pressure in the SL to actuate the trailer main brake, and
   if a fault is detected in the SL, increasing the pressure in the CL to actuate the trailer main brake.

7. The method of claim 1, wherein the method comprises the steps of:
   receiving a user braking input to apply the trailer main brake, wherein the pressure in the CL and in the SL is controlled proportional to the level of the user braking input.

8. An agricultural vehicle, comprising a controller arranged to implement the method as claimed in claim 1.

9. A method of controlling a hydraulic trailer brake system using a hydraulic fluid supply provided on a vehicle, wherein a control line (CL) and a supplementary line (SL) are arranged between the vehicle and a vehicle trailer for supply of hydraulic fluid to and from the trailer, the method comprising the steps of:

monitoring the hydraulic fluid pressure in the CL and in the SL; receiving a user braking input;

controlling the pressure of hydraulic fluid in the CL and in the SL to control the operation of the trailer brake system, wherein said controlling is based on a combination of the received user braking input and the hydraulic fluid pressure in the CL and SL;

receiving a user braking input to apply the trailer main brake fully or to apply an emergency brake;

increasing SL pressure to connect a trailer accumulator to the trailer main brake to actuate the trailer main brake; and increasing CL pressure to supply hydraulic fluid to the trailer main brake and to the trailer accumulator.

10. An agricultural vehicle, comprising a controller arranged to implement the method as claimed in claim 9.

11. A non-transitory computer-readable storage medium comprising computer-executable instructions that, when executed on a computer, perform the method as claimed in claim 9.

12. The method of claim 9, wherein the trailer brake system comprises at least one trailer main brake for the braking of the trailer and a hydraulic fluid accumulator for the storage of a reservoir of hydraulic fluid on the trailer, wherein the method further comprises the step of:

actuating the trailer main brake by selectively connecting of the trailer accumulator to the trailer main brake to supply hydraulic fluid from the trailer accumulator to the trailer main brake, wherein said step of connecting is based at least in part on the SL pressure.

13. The method of claim 12, wherein said step of actuating the trailer main brake further comprises selectively connecting the CL to the trailer main brake to supply hydraulic fluid from the CL to the trailer main brake, wherein said step of connecting is based at least in part on the CL pressure.

14. A trailer valve for a trailer brake system, wherein the trailer valve module comprises:

a CL connection port and an SL connection port for respectively receiving a control line (CL) and a secondary line (SL) from a vehicle brake control system;

an accumulator connection port for receiving an trailer accumulator connection;

a trailer brake connection port for connecting to a main brake of a trailer:

a first distributor valve to control the connection between the CL connection port to the accumulator connection port; and a second distributor valve to control the connection between the CL connection port, the accumulator connection port, and the trailer brake connection port;

wherein the first distributor valve is controlled at least in part based on a pressure differential between the CL and the accumulator connection port;

wherein the second distributor valve is controlled at least in part based on the pressure of the SL, and further controlled at least in part based on the pressure of the CL and the trailer brake connection port.

* * * * *